United States Patent
Raciborski et al.

(10) Patent No.: US 8,126,939 B2
(45) Date of Patent: Feb. 28, 2012

(54) SELECTIVELY UTILIZING A PLURALITY OF DISPARATE SOLID STATE STORAGE LOCATIONS

(75) Inventors: Bohdan Raciborski, Redmond, WA (US); Dilesh Dhokia, Kirkland, WA (US); Bhrighu Sareen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/639,242

(22) Filed: Dec. 16, 2009

(65) Prior Publication Data
US 2010/0095083 A1   Apr. 15, 2010

Related U.S. Application Data

(63) Continuation of application No. 11/714,585, filed on Mar. 6, 2007, now Pat. No. 7,657,572.

(51) Int. Cl.
G06F 7/00 (2006.01)
G06F 17/30 (2006.01)
G06F 12/00 (2006.01)

(52) U.S. Cl. ............ 707/812; 707/821; 707/824
(58) Field of Classification Search ......... 707/812, 707/821, 824, 827, 823; 711/103, 105, 112, 711/113, 118, 170
See application file for complete search history.

(56) References Cited

U.S. PATENT DOCUMENTS

| | | | |
|---|---|---|---|
| 5,568,423 A | 10/1996 | Jou et al. | |
| 5,680,579 A | 10/1997 | Young et al. | |
| 5,787,484 A | 7/1998 | Norman | |
| 5,893,139 A | 4/1999 | Kamiyama | |
| 6,145,069 A | 11/2000 | Dye | |
| 6,189,069 B1 | 2/2001 | Parkes et al. | |
| 6,418,506 B1 | 7/2002 | Pashley et al. | |
| 6,681,309 B2* | 1/2004 | Szendy et al. | 711/173 |
| 6,711,666 B1 | 3/2004 | Feldman | |
| 6,717,857 B2 | 4/2004 | Byeon et al. | |
| 6,728,794 B2 | 4/2004 | Robinson et al. | |
| 6,876,579 B2 | 4/2005 | Liang et al. | |
| 6,917,543 B2 | 7/2005 | Sato | |
| 6,938,116 B2 | 8/2005 | Kim et al. | |
| 7,020,758 B2 | 3/2006 | Fisk | |
| 7,080,193 B2 | 7/2006 | Roohparvar | |
| 7,087,953 B2 | 8/2006 | Lee | |
| 7,096,336 B2* | 8/2006 | Furuhashi et al. | 711/165 |
| 7,127,550 B1 | 10/2006 | Lin | |
| 7,433,245 B2 | 10/2008 | Otsuka et al. | |

(Continued)

FOREIGN PATENT DOCUMENTS

CN   1816795 A   8/2006

(Continued)

OTHER PUBLICATIONS

Ismail Ari, Melanie gottwals and Dick Henze (2004), SANBoost: Automated SAN-Level Caching in Storage Area Networks, p. 164-171.*

(Continued)

*Primary Examiner* — Don Wong
*Assistant Examiner* — Merilyn P Nguyen

(57) ABSTRACT

A method for selectively utilizing a plurality of disparate solid state storage locations is disclosed. The technology initially receives class types for a plurality of disparate solid state storage locations. The characteristics of the received data are determined. The received data is then allocated to one of the plurality of disparate solid state storage locations based upon the determined characteristics of the received data.

19 Claims, 5 Drawing Sheets

U.S. PATENT DOCUMENTS

| | | | |
|---|---|---|---|
| 7,454,446 B2 * | 11/2008 | Leung et al. | 1/1 |
| 7,509,420 B2 | 3/2009 | Moulton et al. | |
| 7,555,575 B2 * | 6/2009 | Kaneda | 710/33 |
| 7,814,128 B2 | 10/2010 | Silvers et al. | |
| 2002/0116575 A1 | 8/2002 | Toyomura et al. | |
| 2002/0174227 A1 * | 11/2002 | Hartsell et al. | 709/226 |
| 2003/0046396 A1 * | 3/2003 | Richter et al. | 709/226 |
| 2003/0050087 A1 | 3/2003 | Kwon | |
| 2005/0010620 A1 * | 1/2005 | Silvers et al. | 707/205 |
| 2005/0021905 A1 | 1/2005 | Kwon | |
| 2005/0036387 A1 | 2/2005 | Seal et al. | |
| 2005/0120137 A1 * | 6/2005 | Moulton et al. | 709/244 |
| 2005/0154821 A1 | 7/2005 | Furuhashi et al. | |
| 2005/0160218 A1 | 7/2005 | See et al. | |
| 2005/0256838 A1 * | 11/2005 | Lasser | 707/1 |
| 2006/0069896 A1 | 3/2006 | Sanders | |
| 2006/0161635 A1 | 7/2006 | Lamkin et al. | |
| 2006/0179212 A1 | 8/2006 | Kim et al. | |
| 2006/0203548 A1 | 9/2006 | You | |
| 2006/0224820 A1 | 10/2006 | Cho et al. | |
| 2006/0248259 A1 | 11/2006 | Ryu et al. | |
| 2006/0277360 A1 | 12/2006 | Sutardja et al. | |
| 2007/0150891 A1 | 6/2007 | Shapiro | |
| 2007/0183198 A1 | 8/2007 | Otsuka et al. | |
| 2008/0215800 A1 | 9/2008 | Lee et al. | |
| 2008/0228998 A1 | 9/2008 | Colecchia et al. | |
| 2009/0193184 A1 | 7/2009 | Yu et al. | |

FOREIGN PATENT DOCUMENTS

| | | |
|---|---|---|
| EP | 1205838 A2 | 5/2002 |
| EP | 1720119 A1 | 11/2006 |
| JP | 2007-004710 | 1/2007 |
| WO | 9843248 A1 | 10/1998 |
| WO | 9918507 A1 | 4/1999 |

OTHER PUBLICATIONS

International Search Report cited in related PCT application No. PCT/US2008/056026 dated Jul. 31, 2008.
"Flash Memories", http://www.st.comIstonline/press/newslback20051b9021m.htm.
"Toshiba Develop Five- and Six-Chip Multi-Chip Packages Combining Nor Flash, Sram, Pseudo Sram and Nand Flash for Advanced Cell Phone Applications", http://www.toshiba.com/taeclnews/press Jeleases/2003/to-299.jsp.
Non-Final Office Action in related U.S. Appl. No. 11/714,585 dated Mar. 20, 2009.
Notice of Allowance in related U.S. Appl. No. 11/714,585 dated Oct. 19, 2009.
"European Search Report", Mailed Date: Aug. 30, 2010, Application No. EP/08/73/1525, Filed Date: Aug. 27, 2010, pp. 7. (MS# 319413.06).
Communication cited in related EP Application No. 08731525.5 dated Sep. 14, 2010.
International Search Report cited in related PCT Application No. PCT/US2008/052709 date Jun. 10, 2008.
Non-Final Office Action cited in related U.S. Appl. No. 11/700,443 dated Apr. 16, 2009.
Final Office Action cited in related U.S. Appl. No. 11/700,443 dated Sep. 16, 2010.
"Compressed Swapping for NAND Flash Memory Based embedded Systems", Sangduck Park, Hyunjin Lim, Hoseok Chang and Wonyong Sung, Lecture Notes in Computer Science, 2005, vol. 3553/2005, pp. 314-323, Abstract only 2 pgs.,Reprinted from the Internet at: http://www.pringerlink.com/content8t75tw9kcja4br62.
"eNVy: A Non-Volatile Main Memory Storage System", Michael Wu and Willy Zwaeneppel, Proceeding ASPLOS=VI Proceedings of the sixth international conference on Architectural support for programming languages and operating systems, 1994, Abstract only 1 pg., Reprinted from the Internet at: http://portal.acm.org/citation.cfm?id=195506&coll=Guide&dl=Guide&retn=1.
"A Flash Compression Layer for SmartMedia Card Systems", Keun Soo Yim, Hyokyung Bahn and Kern Koh, IEEE Transactions on consumer Electronics, vol. 50, Issue 1, Feb. 2004, pp. 192-197, Abstract only 1 pg., Retrieved from the Internet at: http://ieeexplore.ieee.org/iel5/30/28566/01277861.pdf?arnumber=1277861&htrv=1.
Chinese Office Action cited in related in U.S. Appl. No. 11/700,443 dated Dec. 3, 2010.
Chinese Office Action cited in related Chinese Application No. 200880007412.0 dated Nov. 12, 2010.
Japanese Office Action cited in related Japanese Application No. 2009-552886 dated Dec. 1, 2010.
International Preliminary Report on Patentability cited in related PCT Application No. PCT/US2008/056026 dated Sep. 8, 2009.
EP Search Opinion cited in related EP Application No. 08 731 525.5 dated Aug. 27, 2010.
Notice of Allowance in related U.S. Appl. No. 11/700,443 dated Jan. 5, 2011.
Second Chinese Office Action cited in related Chinese Application No. 200880007412.0 dated Jun. 29, 2011.
International Preliminary Report on Patentability cited in PCT Application No. PCT/US2008/052709 dated Aug. 13, 2009.
Second Chinese Office Action cited in related Chinese Application 200880003570.9 dated May 11, 2011.
Notice of Allowance cited in related U.S. Appl. No. 11/700,443 dated Oct. 26, 2011.
EP Communication cited in related Application No. 08731525.5 dated Aug. 12, 2011.
Japanese Office Action cited in related Japanese Application No. 2009-552886 dated Dec. 1, 2010.
Japanese Office Action cited in related Japanese Application No. 2009-552886 dated Jun. 24, 2011.
Russian Office Action cited in related Russian Application No. 2009129412 dated Oct. 19, 2011.

* cited by examiner

SELECTIVELY UTILIZING A PLURALITY OF DISPARATE SOLID STATE STORAGE LOCATIONS

RELATED APPLICATION

This application is a continuation of U.S. patent application Ser. No. 11/714,585, filed on Mar. 6, 2007, entitled "SELECTIVELY UTILIZING A PLURALITY OF DISPARATE SOLID STATE STORAGE LOCATIONS," which is hereby incorporated by reference in its entirety.

FIELD

The disclosure relates to allocating data among different storage locations.

BACKGROUND

Solid state drives (SSDs) are data storage devices that use non-volatile memory to store data, and do not contain the spinning platters found in conventional hard disk drives. Since SSDs have no moving parts and can withstand extreme shock, vibration and temperature changes, SSDs eliminate seek time, latency and other electro-mechanical delays and failures associated with the conventional hard disk drive. As a result of these attributes, SSDs are becoming increasingly popular in markets such as notebook PCs and sub-notebooks for enterprises, Ultra-Mobile PCs, and Tablet PCs for the healthcare and consumer electronics sectors.

However, there exist many limitations to the current state of technology with respect to utilizing SSDs. For example, the cost per storage ratio of SSDs remains significantly higher than that of platter-based hard drives.

Moreover, there are only a handful of companies offering large SSDs of more than 64 gigabytes, with write speeds adequate for replacing traditional hard drives. However, even these drives are limited in quantity, very pricey, and available only by special request. Consequently, SSDs are priced outside the mainstream consumer market and are very limited in quantity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for selectively utilizing a plurality of disparate solid state storage locations is disclosed. The technology initially receives the class type for a plurality of disparate solid state storage locations. The characteristics of the received data are determined. The received data is then allocated to one of the plurality of disparate solid state storage locations based upon the determined characteristics.

The present technology enable the aggregation of disparate types of solid state locations to receive data corresponding to the solid state location memory type, thereby ultimately lowering the cost per storage ratio of memory. Additionally, incorporating the disparate types of solid state locations enables SSDs to support an operating system. Also, the present technology enables existing files on a computer to be rearranged in such as way as to provide for a lower cost per storage ratio of used memory space. Hence, the present technology permits the memory's reduction in cost per storage ratio as well as the replacement of the hard disk drive with SSDs.

DESCRIPTION OF THE DRAWINGS

The accompanying drawings, which are incorporated in and form a part of this specification, illustrate embodiments of the technology for selectively utilizing a plurality of disparate solid state storage locations and, together with the description, serve to explain the principles discussed below.

The drawings referred to in this description should be understood as not being drawn to scale except if specifically noted.

DETAILED DESCRIPTION

Reference will now be made in detail to embodiments of the present technology for selectively utilizing a plurality of disparate solid state storage locations, examples of which are illustrated in the accompanying drawings. While the technology for selectively utilizing a plurality of disparate solid state storage locations will be described in conjunction with various embodiments, it will be understood that they are not intended to limit the present technology for selectively utilizing a plurality of disparate solid state storage locations to these embodiments. On the contrary, the present technology for selectively utilizing a plurality of disparate solid state storage locations is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for selectively utilizing a plurality of disparate solid state storage locations. However, the present technology for selectively utilizing a plurality of disparate solid state storage locations may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "determining", "allocating", "emulating", "supporting", "categorizing", "accessing", "moving", "utilizing", "routing", "rearranging", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for selectively utilizing a plurality of disparate solid state storage locations is also well suited to the use of other computer systems such as, for example, optical and mechanical computers.

Example Computer System Environment

Figure 1:
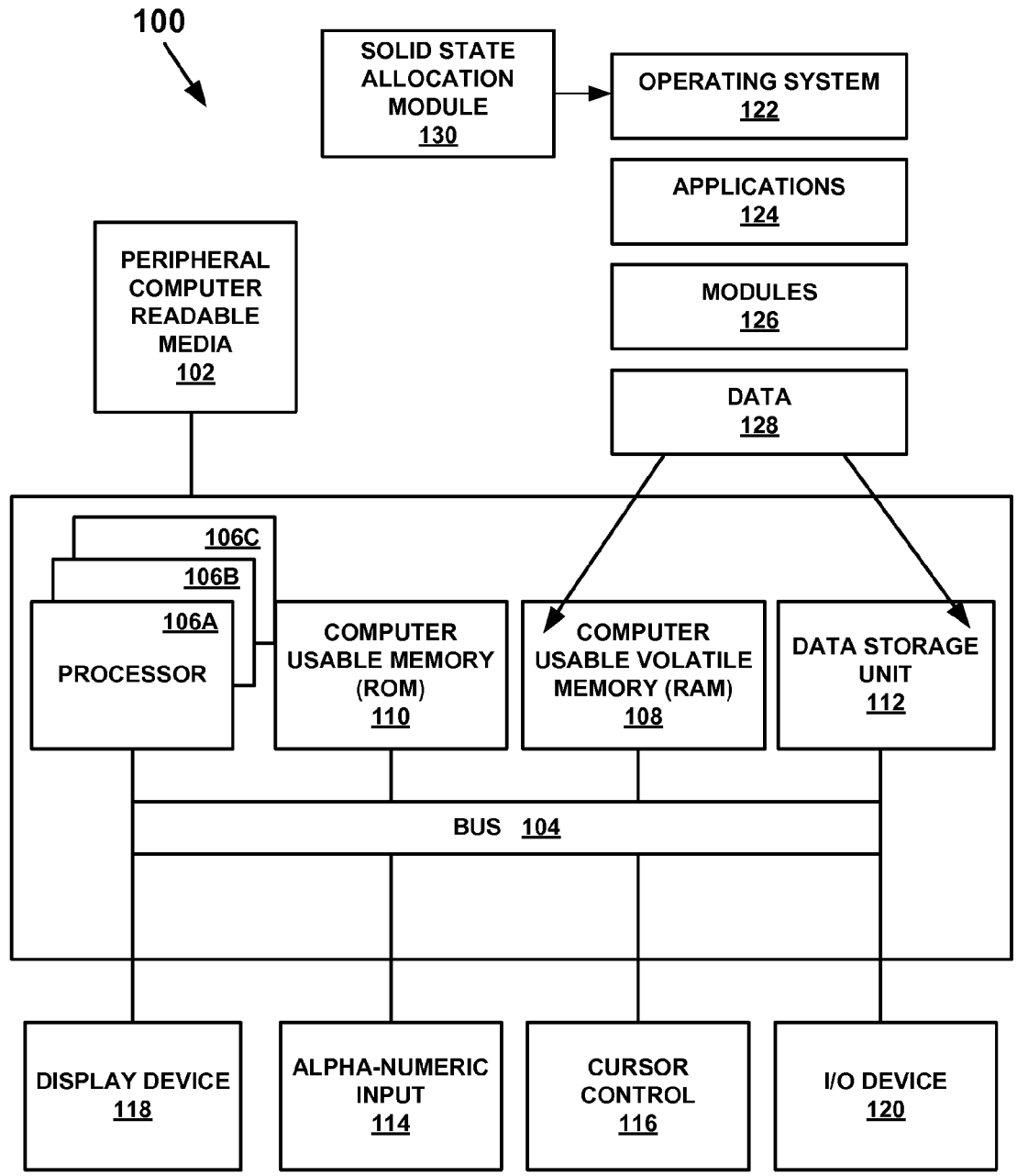
FIG. 1 is a diagram of an example computer system used in accordance with embodiments of the present technology for selectively utilizing a plurality of disparate solid state storage locations.

With reference now to FIG. 1, portions of the technology for selectively utilizing a plurality of disparate solid state storage locations are composed of computer-readable and computer-executable instructions that reside, for example, in computer-usable media of a computer system. That is, FIG. 1 illustrates one example of a type of computer that can be used to implement embodiments, which are discussed below, of the present technology for selectively utilizing a plurality of disparate solid state storage locations.

FIG. 1 illustrates an example computer system 100 used in accordance with embodiments of the present technology for selectively utilizing a plurality of disparate solid state storage locations. It is appreciated that system 100 of FIG. 1 is an example only and that the present technology for selectively utilizing a plurality of disparate solid state storage locations can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for selectively utilizing a plurality of disparate solid state storage locations is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive; and that further, operating system 122 may be accessed from a remote location via, for example, a coupling to the internet. In one embodiment, the present technology for selectively utilizing a plurality of disparate solid state storage locations, for example, is stored as an application 124 or module 126 in memory locations within RAM 108 and memory areas within data storage unit 112.

System 100 also includes a solid state allocation module 130 coupled to operating system 122. In one embodiment, solid state allocation module 130 may be integrated within operating system 122, while in another embodiment, solid state allocation module 130 may be communicatively coupled to and external to the operating system. In yet another embodiment, solid state allocation module 130 is a flash memory device.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the example computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

As an overview, in one embodiment, the present technology provides a method for selectively utilizing a plurality of disparate solid state storage locations, so that the solid state allocation module enables a low cost per storage ratio. For example, an operating system will send to a class type receiver of the solid state allocation module a class type that describes what sort of data each disparate solid state storage location prefers to hold. The operating system will also send to the received data characteristic determiner of the solid state allocation module the data associated with input/output operations.

The received data characteristic determiner will then determine which solid state storage location to which the received data belongs. The received data characteristic determiner then communicates this determination to the disparate solid state storage location allocator of the solid state allocation module. The disparate solid state location allocator then allocates the received data to the disparate solid state storage locations, according to the instructions of the received data characteristic determiner.

While the operating system is communicatively coupled to the solid state allocation module in one embodiment, another embodiment allows the solid state allocation module to be fully integrated within the operating system. Additionally, in another embodiment, the solid state allocation module is communicatively coupled to the disparate solid state storage locations, while also being integrated within a single unit such as a removable smart card. In another embodiment, the solid state allocation module is external and communicatively coupled to the disparate solid state storage locations. Additionally, in the absence of a solid state allocation module which has an embedded disparate solid state storage location allocator, in one embodiment the operating system may perform the similar functions.

In one embodiment, the solid state storage locations emulate a hard disk drive. In another embodiment, the solid state storage locations comprise at least one flash memory storage location.

In short, embodiments of the present technology provide for a computer implemented method for selectively utilizing a plurality of disparate solid state storage locations, comprising: a class type receiver receiving class types for each one of the plurality of disparate solid state storage locations, a received data characteristic determiner determining the characteristics of received data, and a disparate solid state storage location allocator allocating the received data to one of the plurality of disparate solid state storage locations based upon the characteristics of the received data. By using a plurality of disparate solid state storage locations coupled to a solid state allocation module, the present technology enables data's low cost per storage ratio.

Architecture

Figure 2A:
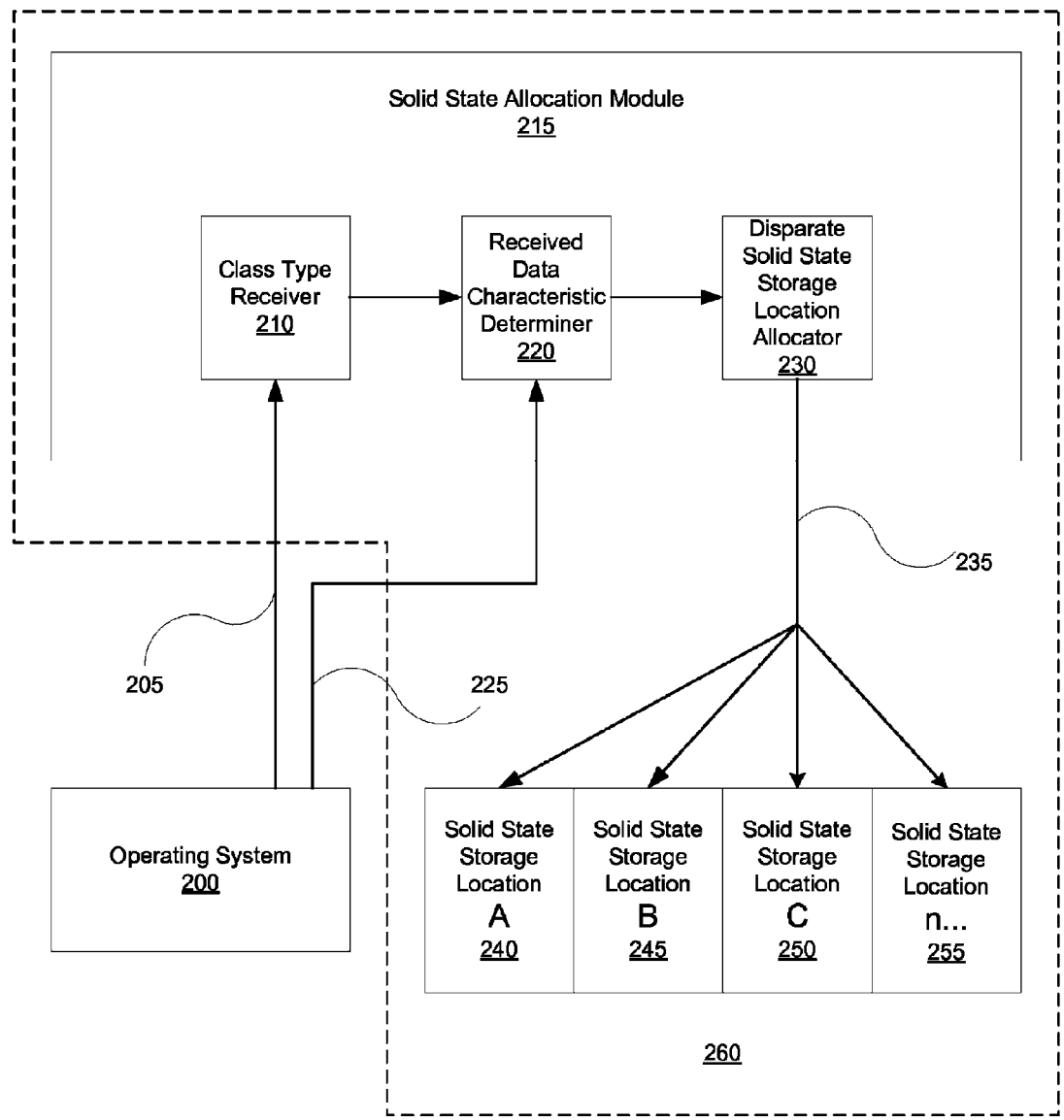
FIG. 2A is a block diagram of an example solid state allocation module for allocating memory associated with an operating system in accordance with one embodiment of the present technology.

With reference now to FIG. 2A, a block diagram of an example solid state allocation module for allocating memory associated with an operating system is shown in accordance with one embodiment of the present technology. In general, solid state allocation module for allocating memory associated with an operating system 200 includes a class type receiver 210, a received data characteristic determiner 220, and a disparate solid state storage location allocator 230, all communicatively coupled to solid state storage location A 240, solid state storage location B 245, solid storage location C 250, and solid state storage location n ... 255.

Additionally, line 205 represents the pathway of data being sent from operating system 200 to class type receiver 210. Line 225 represents the pathway of information describing characteristics of data being sent from operating system 200 to received data characteristic determiner 220. Line 235 represents the pathway of data being sent from solid state storage location allocator 230 to disparate solid state storage locations A 240, B 245, C 250, and n ... 255. Furthermore, pathways 205, 225, and 235 may connect various components in a number of ways, including wired or wirelessly.

In one embodiment, a class type receiver 210 is configured to receive class types for a plurality of disparate solid state storage locations A 240, B 245, C 250, and n ... 255 along pathway 205. Class type receiver 210 receives class type data which describes what sort of data each solid state storage location A 240, B 245, C 250, and n ... 255 holds. Solid state storage location n ... 255 represents a predetermined number of disparate solid state storage locations besides that of solid state storage locations A 240, B 245, and C 250.

For example, solid state storage location A 240 holds data which is written once and read infrequently, solid state storage location B 245 holds data which is written infrequently and read frequently, and solid state storage location C 250 holds data which is written frequently and read frequently. Additionally, solid state storage location n ... 255 represents two more solid state storage devices, that of D and E. Solid state storage device D holds data which is written infrequently and read infrequently, and solid state storage device E holds data which is written fairly frequently and read fairly frequently. The type of data which solid state storage locations A 240, B 245, C 250, and n ... 255 hold is expressed as a class type.

In another example, a class type receiver 210 is configured to receive the class type for only two disparate solid state storage locations A 240 and B 245. Solid state storage location A 240 holds data which is written once and read infrequently, and solid state storage location B 245 holds data which is written infrequently and read infrequently. The type of data which solid state storage locations A 240 and B 245 hold is expressed as a class type.

In yet one more example, a class type receiver 210 is configured to receive the class type for just three disparate solid state storage locations A 240, B 245, and C 250. Solid state storage location A 240 holds data which is written once and read infrequently, solid state storage location B 245 holds data which is written infrequently and read frequently, and solid state storage location C 250 holds data which is written frequently and read frequently. The type of data which solid state storage locations A 240, B 245, and C 250 hold is expressed as a class type.

In one embodiment, the received data characteristic determiner 220 is configured to determine characteristics of data received from the operating system 200. The data received by received data characteristic determiner 220 from operating system 200 is associated with types of input/output operations. For example, data can be categorized into the following classes based on a type of input/output operation: (1) write once and read only after writing; (2) write infrequently and read frequently; and (3) write frequently and read frequently.

Examples of data which is written once and read only after writing include operating system files and application binary files. Examples of data which is written infrequently and read frequently include user data, settings, word files, data spreadsheets, and address books. Examples of data which is written frequently and read frequently include operating system page files, operating system files, registry, logs, and caches.

Received data characteristic determiner 220 may receive varying types of combinations of data associated with input/output operations from along pathway 225. For example, in one embodiment, received data characteristic determiner 220 receives data associated with the input/output operations which require writing once and reading only after writing, and writing frequently and reading frequently. In another embodiment, received data characteristic determiner 220 receives data associated with the input/output operations which require writing infrequently and reading frequently, and writing frequently and reading frequently.

For example, after receiving the class types for at least two of the following solid state storage locations A 240, B 245, C 250, and n . . . 255 and the data associated with the input/output operations from operating system 200, received data characteristic determiner 220 then determines in which solid state storage location A 240, B 245, C 250, and n . . . 255 to place the received data associated with input/output operations. This determination is based upon the received data from operating system 200 correlating to the class type of each solid state storage location. Received data characteristic determiner 220 then communicates this decision to disparate solid state storage location allocator 230.

In one embodiment, disparate solid state storage location allocator 230 is configured to allocate the data received from operating system 200 to one of the plurality of disparate solid state storage locations based upon the received data's characteristics. Disparate solid state storage location allocator 230 sends the received data along pathway 225 to at least two of the following solid state storage locations A 240, B 245, C 250, and n . . . 255.

In the present technology, it is possible to have class type receiver 210, received data characteristic determiner 220, and disparate solid state storage location allocator 230 occur in combination within a module, but communicatively coupled to a separate module containing the solid state storage locations A 240, B 245, C 250, and n . . . 255. Additionally, another example of the present technology might have class type receiver 210, received data characteristic determiner 220, and disparate solid state storage location allocator 230 communicatively coupled to each other but existing in separate modules, while still being communicatively coupled to solid state storage locations A 240, B 245, C 250, and n . . . 255.

In one embodiment, disparate solid state storage location allocator 230 allocates the received data to a flash memory storage module in addition to other solid state storage locations A 240, B 245, C 250, and n . . . 255. In yet another embodiment, disparate solid state storage location allocator 230 allocates the received data to a flash memory storage module which is a hard disk drive emulator.

In an example of the present technology, solid state allocation module 215 is communicatively coupled to the solid state storage location A 240, B 245, C 250, and n . . . 255 in such a way as to be combined on a single storage location 260. This single storage location may be a removable card. A computer chip is integrated within the removable card. This computer chip contains the combination of solid state allocation module 215 and disparate solid state storage location allocator 230. The insertion of this removable card permits users to insert solid state allocation module 215 communicatively coupled to solid state storage locations A 240, B 245, C 250, and n . . . 255 into a computer device. Once the removable card is inserted, solid state allocation module 215 becomes communicatively coupled to operating system 200 of the computer device.

Figure 2B:
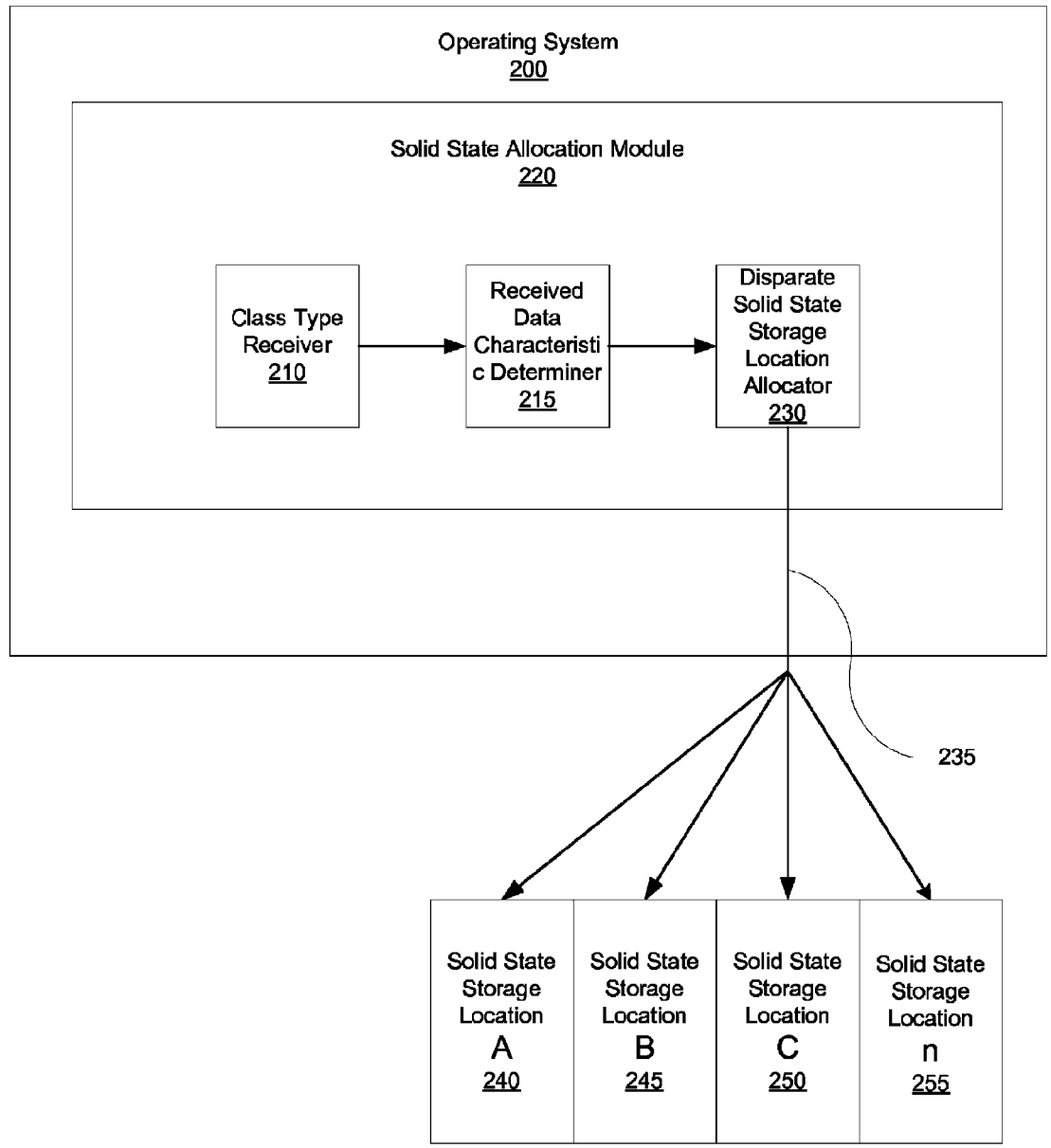
FIG. 2B is a block diagram of an example solid state allocation module for allocating memory associated with an operating system in accordance with one embodiment of the present technology.

With reference now to FIG. 2B, a block diagram of an example solid state allocation module for allocating memory associated with operating system 200 is shown in accordance with one embodiment of the present technology. In general, solid state allocation module for allocating memory associated with operating system 200 includes class type receiver 210, received data characteristic determiner 220, disparate solid state storage location allocator 230, solid state storage location A 240, solid state storage location B 245, solid storage location C 250, and solid state storage location n . . . 255.

Additionally, line 235 represents the pathway of data being sent from solid state storage location allocator 230 to disparate solid state storage locations A 240, B 245, C 250, and n . . . 255. Furthermore, pathway 235 may connect the disparate solid state storage location allocator 230 to solid state storage locations A 240, B 245, C 250, and n . . . 255 in a number of ways, including wired or wirelessly.

In one embodiment, solid state allocation module 215 is integrated within operating system 200, but is externally and communicatively coupled to solid state storage locations A 240, B 245, C 250, and n . . . 255. Additionally, disparate solid state storage location allocator 230 can be implemented and embedded in solid state allocation module 220, or implemented in software as part of operating system 200. Additionally, solid state storage locations A 240, B 245, C 250, and n . . . 255 are externally coupled to operating system 200.

Operation

Figure 3:
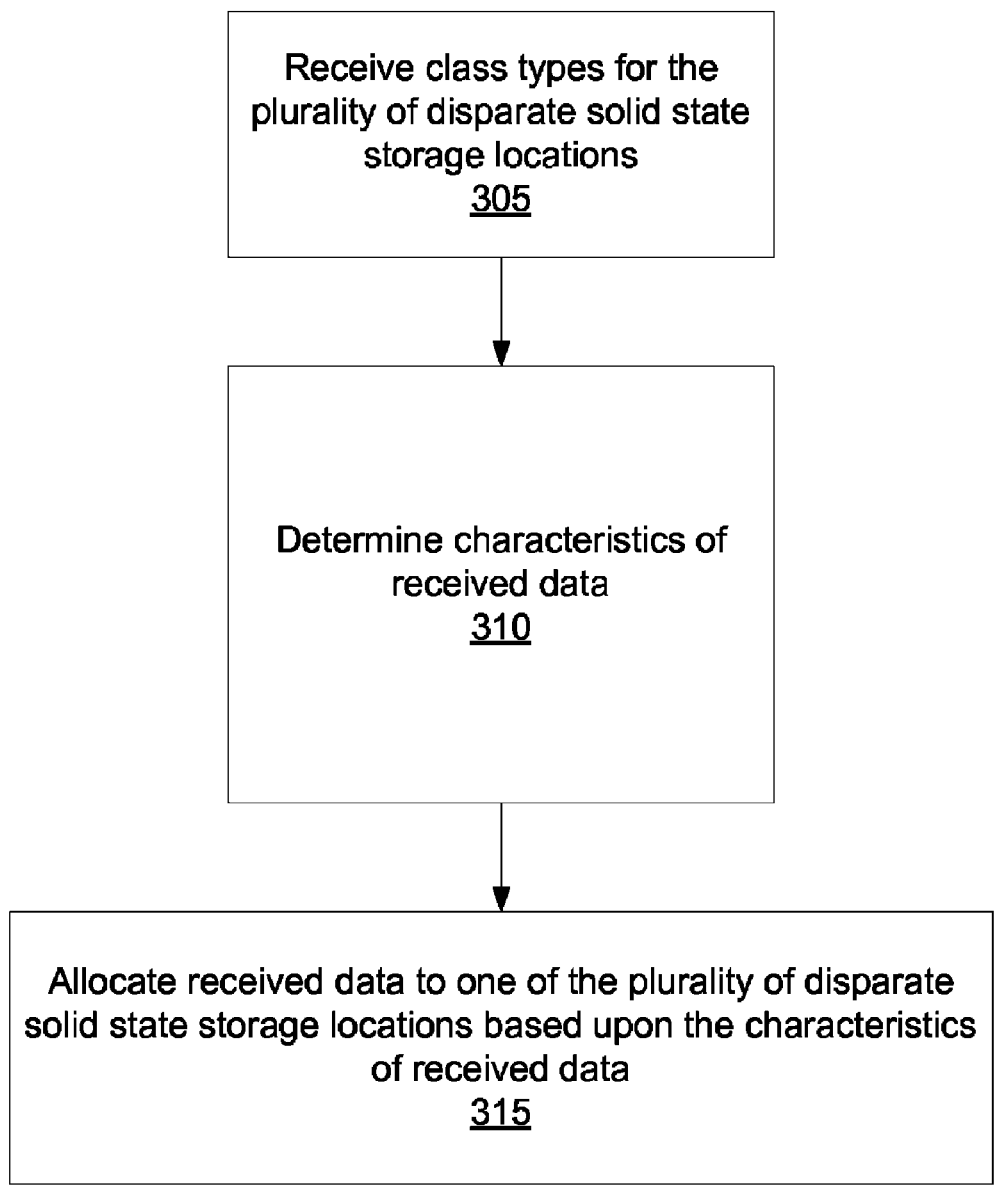
FIG. 3 is a flowchart of an example method for selectively utilizing a plurality of disparate solid state storage locations in accordance with one embodiment of the present technology.

With reference now to FIG. 3, a flowchart 300 of a computer implemented example method of selectively utilizing a plurality of disparate solid state storage locations is shown in accordance with one embodiment of the present technology.

Referring now to 305 of FIG. 3 and to FIG. 2A, one embodiment receives a class type for each of the plurality of disparate solid state storage locations. As described herein, in another embodiment of the present technology, the class type which is sent along pathway 205 is received by class type receiver 210. In general, the class type describes what sort of data each solid state storage location A 240, B 245, C 250, and n . . . 255 holds. Solid state storage location n . . . 255 represents a predetermined number of disparate solid state storage locations besides that of solid state storage locations A 240, B 245, and C 250.

One embodiment of the present technology receives class types for the plurality of disparate solid state storage locations 305 by utilizing operating system 200 to determine class types. Operating system 200 may be communicatively coupled to and external to solid state allocation module 215, or solid state allocation module 215 may be integrated within operating system 200. Class type receiver 210 then communicates the class type of each of the plurality of disparate solid state storage locations A 240, B 245, C 250, and n . . . 255 to received data characteristic determiner 220.

Referring now to 310 of FIG. 3 and to FIG. 2A, one embodiment determines characteristics of received data 310. As described herein, in another embodiment of the present technology, determining characteristics of received data 310 includes categorizing the received data associated with input/output operations into at least one class corresponding to the class type for each of plurality of disparate solid state storage locations A 240, B 245, C 250, and n . . . 255. This received data associated with input/output operations was sent from operating system 200, along pathway 225, to received data characteristic determiner 220. Additionally, after received data characteristic determiner 220 determines the allocation of the received data to solid state storage locations A 240, B 245, C 250, and n . . . 255, received data characteristic determiner 220 communicates this determination to disparate solid state storage location allocator 230.

In another embodiment of the present technology, determining characteristics of received data 310 includes utilizing a data importance characteristic. A data importance characteristic includes aspects of the data associated with input/output operations which serve to describe what type of memory is required to hold this data. For example, operating system 200 will send along pathway 225 data associated with input/output operations to received characteristic determiner 220. Received characteristic determiner 220 will then divide the data up into groups according to the following characteristics: (1) data which is written once and read only after written; (2) data which is written infrequently and read frequently; and (3) data which is written frequently and read frequently. Received data characteristic determiner 220 will then determine to which solid state storage locations A 240, B 245, C 250, and n . . . 255 each of the grouped received data will be sent, based upon the class types of the solid state storage locations received from class type receiver 210.

For example, the operating system 200 sends to class type receiver 210 information that solid state storage location A 240 is a storage location for data which is written infrequently and read frequently. Operating system 200 sends to received data characteristic determiner 220 via pathway 225, the data associated with input/output operations, which is intended to be stored in one of solid state storage locations A 240, B 245, C 250, and n . . . 255. Received data characteristic determiner 220 determines the type of data associated with these input/output operations. Received data characteristic determiner 220 next determines that a certain percentage of the received data is data that is written infrequently and read frequently. Data characteristic determiner 220 then determines that this written infrequently and read frequently received data should be allocated to solid state storage location A 240, since this storage location is configured to hold data which is written infrequently and read frequently.

Referring now to 315 of FIG. 3 and to FIG. 2A, one embodiment allocates the received data to one of the plurality of disparate solid state storage locations A 240, B 245, C 250, and n . . . 255 based upon the characteristics determined by received data characteristic determiner 220. Received data is sent to at least two of disparate solid state storage locations A 240, B 245, C 250, and n . . . 255.

Allocating the received data to one of the plurality of disparate solid state storage locations based upon characteristics of the received data 315 includes moving a file from one of the plurality of disparate solid state storage locations A 240, B 245, C 250, and n . . . 255 to another of the plurality of disparate solid state storage locations A 240, B 245, C 250, and n . . . 255, after received data characteristic determiner 220 has accessed the attributes of a file, wherein the file is stored in one of the plurality of disparate solid state storage locations, based upon said attributes of the file. The attributes of a file include data such as how often a file has been accessed during the computer's usage, how important the file is to the present day operations, the file's size, as well as the data associated with input/output operations.

In general, received data characteristic determiner 220 has the capability of monitoring the attributes of the data stored within the plurality of disparate solid state storage locations A 240, B 245, C 250, and n . . . 255. If and when received data characteristic determiner 220 accesses a file stored on one of the solid state storage locations A 240, B 245, C 250, and n . . . 255, and determines that the file's attributes render the file be moved to a different one of the solid state storage locations A 240, B 245, C 250, and n . . . 255, then received data characteristic determiner 220 communicates this decision to disparate solid state storage location allocator 230.

Furthermore, after disparate solid state storage location allocator 230 receives the communication from received data characteristic determiner 220 that a file needs to be moved to a different one of the solid state storage locations A 240, B 245, C 250, and n . . . 255, disparate solid state storage location allocator 230 then follows these instructions. The disparate solid state storage location allocator 230 reaches into the solid state storage locations A 240, B 245, C 250, and n . . . 255 and rearranges the files according to received data characteristic determiner's 220 instructions.

For example, suppose a data file has not been read for a period of six months. Received data characteristic determiner 220 also recognizes that this data file has not been read for a period of six months. The file also happens to be currently residing in a solid state storage location which accommodates data which is written infrequently and read frequently. Since this data file is no longer being read frequently for a certain period of time, received data characteristic determiner 220 instructs disparate solid state storage location allocator 230 to rearrange the data file by placing the data file into solid state storage location n . . . 255 which accommodates data which is written infrequently and read infrequently.

Furthermore, in the absence of solid state allocation module 215 which has an embedded determiner, in one embodiment operating system 200 may perform similar functions as solid state allocation module 215. For example, assume that operating system 200 has more than two non-volatile solid state storage location n . . . 255 attached. Operating system 200 can then make decisions on which solid state storage location n . . . 255 to store data blocks in the same manner as the hardware based disparate solid state storage location allocator 230 makes decisions.

Referring again to FIG. 3 and to FIG. 2A, another embodiment of a computer implemented method for selectively utilizing a plurality of disparate solid state storage locations 300, the plurality of disparate solid state storage locations A 240, B 245, C 250, and n . . . 255 emulate a hard disk drive. In one embodiment, the plurality of disparate solid state storage locations A 240, B 245, C 250, and n . . . 255 emulate and essentially replace a hard disk drive. In another embodiment, the plurality of disparate solid state storage locations A 240, B 245, C 250, and n . . . 255 emulate a portion of a hard disk drive.

In another example of the present technology, the plurality of disparate solid state storage locations A 240, B 245, C 250, and n . . . 255 support operating system 200. Solid state allocation module 215 is communicatively coupled to operating system 200. In another embodiment, solid state allocation module 215 is integrated within operating system 200. Solid state allocation module 215 is also communicatively coupled to solid state storage locations A 240, B 245, C 250, and n . . . 255. Solid state storage locations A 240, B 245, C 250, and n . . . 255 act as the memory storage spaces for operating system 200.

In another example, the plurality of disparate solid state storage locations A 240, B 245, C 250, and n . . . 255 supporting operating system 200, comprise at least one flash memory storage location. For instance, of the plurality of disparate solid state storage locations A 240, B 245, C 250, and n . . . 255, solid state storage location A 240 is a flash memory storage location, whereas solid state storage locations B 245, C 250, and n . . . 255 are some other type of solid state storage location.

In another example method, all of the plurality of disparate solid state storage locations A 240, B 245, C 250, and n . . . 255 are flash memory storage locations. Furthermore, in another example, of the plurality of disparate solid state storage locations A 240, B 245, C 250, and n . . . 255, solid state storage locations A 240 and B 245 are flash memory storage locations, whereas storage locations C 250 and n . . . 255 are some other type of solid state storage location.

Figure 4:
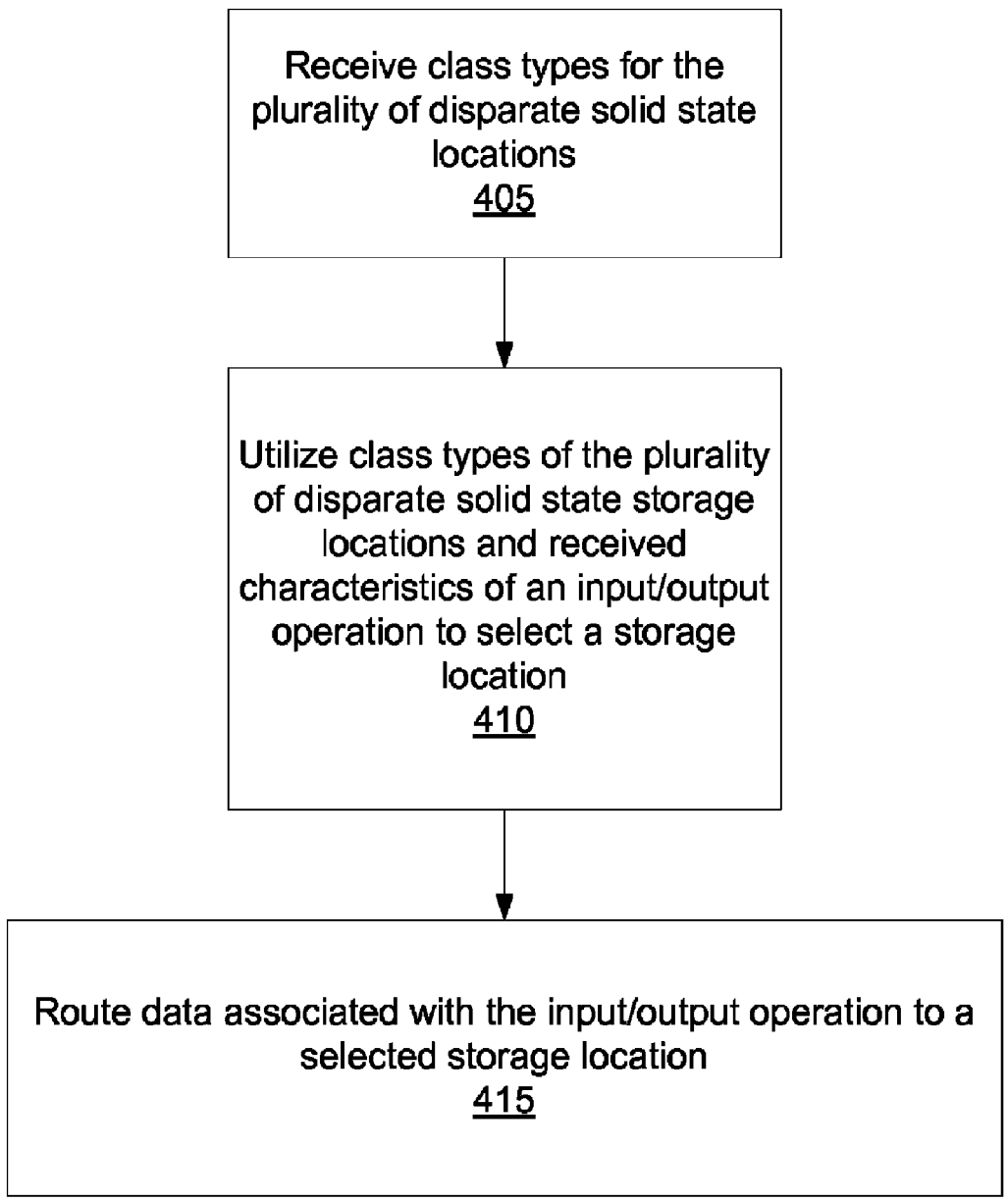
FIG. 4 is a flowchart of an example for selectively utilizing a plurality of disparate solid state storage locations in accordance with one embodiment of the present technology.

With reference now to FIG. 4, a flowchart 400 of instructions on a computer-usable medium wherein the instructions when executed cause a computer system to perform a method of selectively utilizing a plurality of disparate solid state storage locations is shown in accordance with one embodiment of the present technology.

Referring now to 405 of FIG. 4 and to FIG. 2A, one embodiment receives class types for the plurality of disparate solid state storage locations 405. Receiving class types for the plurality of disparate solid state storage locations 405 is similar to receiving class types for the plurality of disparate solid state storage locations 305. Since explanations herein of receiving class types for the plurality of disparate solid state storage locations 305 are applicable to receiving class types for the plurality of disparate solid state storage locations 405, for purposes of clarity and brevity these explanations will not be repeated.

Referring now to 410 of FIG. 4 and to FIG. 2A, one embodiment utilizes class types of the plurality of disparate solid state storage locations and received characteristics of an input/output operation to select a storage location 410. Utilizing class types of the plurality of disparate solid state storage locations and received characteristics of an input/output operation to select a storage location 410 is similar to determining characteristics of received data 310. Since explanations herein of determining characteristics of received data 310 are applicable to utilizing class types of the plurality of disparate solid state storage locations and received characteristics of an input/output operation to select a storage location 410, for the purposes of clarity and brevity these explanations will not be repeated.

Additionally, referring to 410 of FIG. 4 and to FIG. 2A, in one embodiment, utilizing class types of the plurality of disparate solid state storage locations and received characteristics of an input/output operation to select a storage location 410 further comprises utilizing a frequency of access characteristic. This frequency of access characteristic refers to data describing how often one of the plurality of disparate solid state storage locations A 240, B 245, C 250, and n . . . 255 is written to and/or read.

As an example, suppose disparate solid state storage location A 240 contains memory space intended for files that are to be written to infrequently and read frequently. Also, suppose a file which is stored on disparate solid state storage location A 240 has been read only once in the last year. Received data characteristic determiner 220 may decide, dependant upon predetermined instructions, to move this file to disparate solid state storage location B 245 since disparate solid state storage location B 245 contains memory space intended for files that are to be written to infrequently and read infrequently.

Referring now to 415 of FIG. 4 and to FIG. 2A, one embodiment routes data associated with the input/output operation to a selected storage location 415. In another embodiment routing data associated with the input/output operation to a selected storage location 415 further comprises utilizing a single addressable storage name space that represents the aggregate of the plurality of disparate solid state storage locations n . . . 255. For example, disparate solid state storage location allocator 230 exposes just a single storage name space for the plurality of solid state storage locations n . . . 255. As a result, applications like backup or operating system 200 only see a single addressable storage name space representing all solid state storage location n . . . 255 instead of each individual solid state storage location A240, B245, C250, and/or n . . . 255.

Routing data associated with the input/output operation to a selected storage location 415 is similar to allocating received data to one of the plurality of disparate solid state storage locations based upon characteristics of received data 315. Since explanations herein of allocating received data to one of the plurality of disparate solid state storage locations based upon the characteristics of received data 315 are applicable to routing data associated with the input/output operation to a selected storage location 415, for purposes of clarity and brevity these explanations will not be repeated.

Thus, the present technology provides a computer implemented method for selectively utilizing a plurality of disparate solid state storage locations A 240, B 245, C 250, and n . . . 255. Moreover, the present technology's enablement of a plurality of disparate solid state storage locations suited for various data associated with input/output operations, allows for the reduction in the cost per storage ratio of stored data in memory space. Additionally, the present technology enables the plurality of disparate solid state storage locations A 240, B 245, C 250, and n . . . 255 or some combination thereof, to emulate a hard disk drive. Furthermore, the present technology enables the use of flash memory storage space to be used as any number of the plurality of disparate solid state storage locations A 240, B 245, C 250, and n . . . 255.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for selectively utilizing a first solid state storage location and a second solid state storage location, comprising:
    determining an allocation for received data between the first and second solid state storage locations based upon one or more characteristics associated with the received data, a first class type of the first solid state storage location, and a second class type of the second solid state storage location, the allocation determined based upon a first input/output access frequency characteristic as the first class type and a second input/output access frequency characteristic as the second class type; and
    allocating the received data among the first and second solid state storage locations based upon the determined allocation,
    at least some of at least one of the determining and the allocating implemented, at least in part, via a microprocessor.

2. The method of claim 1, comprising:
    reallocating data among the first and second solid state storage locations based upon one or more monitored attributes of the allocated data.

3. The method of claim 2, the received data comprising a file.

4. The method of claim 3, the one or more monitored attributes comprising a frequency of access to the file.

5. The method of claim 1, the determining an allocation comprising:

determining the allocation based upon one or more input/output operations associated with the received data.

6. The method of claim 1, comprising:
determining characteristics indicative of expected occurrences of input/output operations to the received data based upon one or more input/output operations associated with the received data.

7. The method of claim 1, comprising:
reallocating data among the first and second solid state storage locations based upon a third input/output access frequency characteristic of the first solid state storage location and a fourth input/output access frequency characteristic of the second solid state storage location.

8. A solid state allocation module for allocating memory associated with an operating system comprising:
a class type receiver configured to receive a first class type of a first solid state storage location and a second class type of a second solid state storage location;
a received data characteristic determiner configured to determine characteristics of received data and determine characteristics indicative of expected occurrences of input/output operations to the received data based upon one or more input/output operations associated with the received data; and
a solid state storage location allocator configured to:
allocate the received data among the first and second solid state storage locations based upon the determined characteristics of the received data and the first and second class types,
at least some of at least one of the class type receiver, the received data characteristic determiner, and the solid state storage location allocator implemented, at least in part, via a microprocessor.

9. The solid state allocation module of claim 8, the class type receiver configured to:
receive a first input/output access frequency characteristic of the first solid state storage location as the first class type; and
receive a second input/output access frequency characteristic of the second solid state storage location as the second class type.

10. The solid state allocation module of claim 8, the solid state storage location allocator configured to:
reallocate the data among the first and second solid state storage locations based upon a first input/output access frequency characteristic of the first solid state storage location and a second input/output access frequency characteristic of the second solid state storage location.

11. The solid state allocation module of claim 8, the solid state allocation module comprising a flash memory storage module configured as a hard disk drive emulator.

12. The solid state allocation module of claim 8, the characteristics derived from input/output operations comprising at least one of:
a write once and read only after writing set of operations;
a write infrequently and read frequently set of operations;
a write infrequently and read infrequently set of operations;
a write frequently and read frequently set of operations; and
a write frequently and read infrequently set of operations.

13. The solid state allocation module of claim 8, the class type receiver configured to:
receive the first class type and the second class type from an operating system.

14. The solid state allocation module of claim 8, the solid state storage location allocator configured to allocate the received data based upon a data importance characteristic.

15. A computer readable storage medium comprising computer executable instructions that when executed by a processor of a computing system, perform a method comprising:
determining an allocation for received data between first and second solid state storage locations based upon one or more characteristics associated with the received data, a first class type of the first solid state storage location, and a second class type of the second solid state storage location, the allocation determined based upon a first input/output access frequency characteristic as the first class type and a second input/output access frequency characteristic as the second class type; and
allocating the received data among the first and second solid state storage locations based upon the determined allocation.

16. The computer readable storage medium of claim 15, comprising:
emulating a hard disk drive through utilizing the first and second solid state storage locations.

17. The computer readable storage medium of claim 15, comprising:
reallocating data among the first and second solid state storage locations based upon one or more monitored attributes of the allocated data, the one or more monitored attributes comprising at least one of: importance of the data to present day operations and data size of the data.

18. The computer readable storage medium of claim 15, the one or more characteristics comprising one or more input/output operations comprising at least one of:
a write once and read only after writing set of operations;
a write infrequently and read frequently set of operations;
a write infrequently and read infrequently set of operations;
a write frequently and read frequently set of operations; and
a write frequently and read infrequently set of operations.

19. The computer readable storage medium of claim 15, the computer executable instructions configured to execute within a removable smart card external to the first and second solid state storage locations and an operating system associated with the received data.

* * * * *